United States Patent Office 3,328,258
Patented June 27, 1967

3,328,258
ANTI-MICROBIAL THERAPEUTICS CONSISTING OF NITROFURANTOIN, TETRACYCLINE, AND D-GLUCOSAMINE
Louis Fontaine, Lyon, France, assignor to Lipha, Lyonnaise Industrielle Pharmaceutique
No Drawing. Filed Sept. 9, 1963, Ser. No. 307,375
Claims priority, application France, Sept. 10, 1962, 909,038, Patent 2,193
6 Claims. (Cl. 167—65)

This invention relates to a new wide-spectrum medicine with high activity in the treatment of infectious diseases.

The medicine of the invention is a composition made by mixing with suitable excipients the following active components:

| | Percent |
|---|---|
| N-(5-nitro-2-furfurylidene) - 1 - aminohydantoin (nitrofurantoin) | 5–20 |
| Tetracycline | 30–70 |
| 2-amino-D-glucose (D-glucosamine) | 30–70 |

The above components are in the form of physiologically acceptable free bases or salts, in the above proportions.

The new composition is obtained by the usual operations of mixing and homogenizing.

It has been found that this combination of components has unexpected synergic antimicrobial activity.

Such synergy was evidenced by pharmacological tests in vivo and by clinical tests.

In vivo tests were effected on batches of male Swiss mice, the animals having been experimentally infected by dilutions of pathogenic germs and the germ suspension having been injected by the intra-peritoneal route. Two germs chosen for the experiments:

one gram+ (*Streptococcus pyogenes*)
one gram− (*Escherichia cola*)

The richness of the suspension of pathogenic germs was such that in the control batch, mortality reached 100% within 20 hours.

The anti-microbial substances were introduced per os, the total dose having been divided into four portions: the first, one hour before the microbial infection; the three others within the next 24 hours.

The various batches of animals were subjected to the following treatments:

| Batch A | control (no treatment). |
|---|---|
| Batch B | Nitrofurantoin. |
| Batch C | Tetracycline hydrochloride. |
| Batch D | Nitrofurantoin+tetracycline hydrochloride+D-glucosamine hydrochloride. |

The proportions of anti-microbial substances administered were as follows:

| | Mg./kg. |
|---|---|
| Nitrofurantoin | 5 |
| Tetracycline hydrochloride | 25 |
| Nitrofurantoin+tetracycline hydrochloride | 5+25 |
| Nitrofurantoin+tetracycline hydrochloride+D-glucosamine hydrochloride | 5+25+25 |

The results obtained under the above specified conditions are summarized hereafter.

*1st test*: Streptococcus pyogenes

| | Animals surviving after 7 days' observation |
|---|---|
| Control | 0 |
| Nitrofurantoin | 2/10 |
| Tetracycline hydrochloride | 3/10 |
| Nitrofurantoin+tetracycline hydrochloride | 7/10 |
| Nitrofurantoin+tetracycline hydrochloride+D-glucosamine hydrochloride | 10/10 |

*2nd test*: Escherichia coli

| | Animals surviving after 7 days' observation |
|---|---|
| Control | 0 |
| Nitrofurantoin | 5/10 |
| Tetracycline hydrochloride | 1/10 |
| Nitrofurantoin+tetracycline hydrochloride | 7/10 |
| Nitrofurantoin+tetracycline hydrochloride+D-glucosamine hydrochloride | 10/10 |

In either case, a distinct improvement is obvious with nitrofurantoin+tetracycline+D-glucosamine over nitrofurantoin or tetracycline taken singly, or even over nitrofurantoin+tetracycline.

We therefore have an in vivo synergy of the association nitrofurantoin+tetracycline hydrochloride+D - glucosamine hydrochloride, since D-glucosamine is ineffective against the germs considered.

Clinical tests have confirmed this discovery of a powerful anti-microbial medicinal synergy between nitrofurantoin, tetracycline hydrochloride and D-glucosamine hydrochloride in the above-defined proportions.

The medicine of the invention may be used in therapeutics for efficiency in the treatment of infections of the respiratory system, such as pulmonary infections and infections of the superior respiratory ducts, particularly of those infections which are refractory to treatment by streptomycin, with special indication in pediatry; it is also indicated in the treatment of infections of the digestive system, with special indication for the biliary tract, and in the treatment of genito-urinary infections. The new medicinal compound according to the invention may be used against such infectious diseases as rickettsioses and brucelloses, for instance, as well as against cutaneous infections: anthrax, furonculosis, etc. In surgery, the new synergic combination is indicated for pre-operative and post-operative use.

The medicine is offered under a form acceptable in human therapeutics, by the oral, rectal or parenteral route, such as tablets, pills, capsules, suppositories and ampoules.

The strength of the various unit doses may range, according to the chosen route, from 27.5 to 550 mg. of the mixture of active substances, and the daily doses shall be 27.5 to 3,300 mg.

The proportions of each component may generally vary so that the weight of nitrofurantoin makes up from 10% to 50% of the tetracycline hydrochloride and D- glucosamine hydrochloride the following proportions being preferred:

| | |
|---|---|
| Nitrofurantoin | 1 |
| Tetracycline hydrochloride | 5 |
| D-glucosamine hydrochloride | 5 |

A formula for a pill is given hereafter as a non-limitative example:

| | Mg. |
|---|---|
| Nitrofurantoin | 25 |
| Tetracycline hydrochloride | 125 |
| D-glucosamine hydrochloride | 125 |

Excipients (lubrifier, disintegrator, etc.), q.s.p. one 0.600 g. pills.

What I claim is:

1. A medicinal composition for the treatment of infectious diseases caused either by gram-positive bacteria, particularly *Strepococcus pyogenes* or by gram negative bacteria, particularly *E. coli*, consisting as active ingredients of
    (a) a member of the class consisting of N-(5-nitro-2-furfurylidene)-1-aminohydantoin and its non-toxic salts;
    (b) a member of the class consisting of tetracycline and its non-toxic salts, and
    (c) a member of the class consisting of 2-amino-D-glucose and its non-toxic salts.

2. A medicinal composition for the treatment of infectious diseases caused either by gram-positive bacteria, particularly *Streptococcus pyogenes* or by gram negative bacteria, particularly *E. coli*, consisting of a mixture of 5–20% N-(5-nitro-2-furfurylidene)-1-aminohydantoin, 30–70% tetracycline and 30–70% 2-amino-D-glucose.

3. A medicinal composition for the treatment of infectious diseases caused either by gram-positive bacteria, particularly *Streptococcus pyogenes* or by gram negative bacteria, particularly *E. coli*, consisting of a mixture of 1 part N-(5-nitro-2-furfurylidene)-1-aminohydantoin, 5 parts tetracycline hydrochloride and 5 parts 2-amino-D-glucose hydrochloride.

4. The method of combating infectious diseases caused either by gram-positive bacteria, particularly *Streptococcus pyogenes* or by gram negative bacteria, particularly *E. coli* which comprises the administration to a mammal of an effective dose of a mixture of
    (a) a member of the class consisting of N-(5-nitro-2-furfurylidene)-1-aminohydantoin and its non-toxic salts;
    (b) a member of the class consisting of tetracycline and its non-toxic salts, and
    (c) a member of the class consisting of 2-amino-D-glucose and its non-toxic salts.

5. The method of combating infectious diseases caused either by gram-positive bacteria, particularly *Streptococcus pyogenes* or by gram negative bacteria, particularly *E. coli* which comprises the administration to a mammal of an effective dose of a mixture of N-(5-nitro-2-furfurylidene)-1-aminohydantoin, tetracycline hydrochloride, and 2-amino-D-glucose hydrochloride.

6. A method of producing synergic in vivo antimicrobial activity against mortal infections in animals infected intraperitoneally with pathogenic germs selected from the group consisting of gram-positive *Streptococcus pyogenes* and gram-negative *Escherichia coli*, which comprises introducing per os a mixture of one part nitrofurantoin, 5 parts tetracycline hydrochloride, and 5 parts D-glucosamine hydrochloride.

References Cited

UNITED STATES PATENTS

| | | | |
|---|---|---|---|
| 2,710,806 | 6/1955 | Gyorgy et al. | 99—54 |
| 2,786,051 | 3/1957 | Gyorgy et al. | 260—211.5 |
| 3,148,113 | 9/1964 | Carlozzi et al. | 167—55 |
| 3,232,836 | 2/1966 | Carlozzi et al. | 167—65 |

FOREIGN PATENTS

| | | |
|---|---|---|
| 856,493 | 12/1960 | Great Britain. |
| 896,940 | 5/1962 | Great Britain. |

OTHER REFERENCES

Amar, "Comparison of Furadantin and Tetracycline in Prevention of Experimental Pyelonephritis," J. Urol. 85 (1): 89–91, January 1961.

Clapper et al., "The Combined Activity of Nitrofurantoin and Antibiotics on Strains of Resistant Bacteria Commonly Found in Urinary Tract Infections," Antibiotics and Chemotherapy 7 (4): 193–199, April 1957 (P.O.S.L. #RM 663 A1 A6).

Cumulated Index Medicus, vol. 2, part III, Subject Index K–Z, "Nitrofurans" pp. S–1729, S–1730 (1961) (P.O.S.L. #R10015c).

Cumulated Index Medicus, vol 3, part III, Subject K–Z, "Nitrofurans," pp. S–2005, S–2006 (1962) (P.O.S.L. #R10015c).

Nathan, "Use of Glucosamine-Potentiated Tetracycline in the Treatment of Upper Respiratory Infections in Children," Archives of Pediatrics 75 (6): 251–255, June 1958.

Sadi et al., "Results Obtained With the Use of Tetracycline Phosphate Compound Associated With Nitrofurantoin 'Mixurin,' in Infections of the Urogenital System," Hospital (R10), 60: 713–718, November 1961.

Thian et al., "Prophylactic Use of Glucosamine-Potentiated Antibiotics in Emergency Abdominal and Gastrointestinal Surgery," J. La Med. Soc. 111 (2): 49–50, February 1959.

Zwart, Voorspuij et al., "The Concomitant Antibacterial Action of Nitrofurantoin and Other Antimicrobial Agents In Vitro," Antibiotics and Chemotherapy 8 (4): 171–179, April 1958 (P.O.S.L. #RM663A1A6).

LEWIS GOTTS, *Primary Examiner.*

S. K. ROSE, *Assistant Examiner.*